Feb. 15, 1966  H. S. VAN BUREN, JR  3,234,678
ORNAMENTAL LETTER ASSEMBLY
Original Filed Sept. 26, 1960
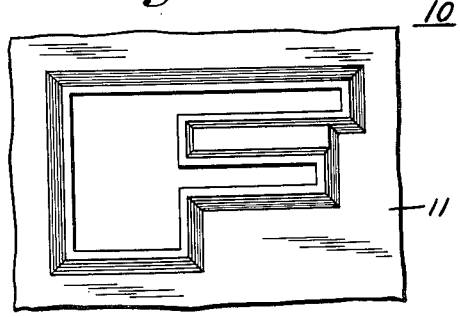
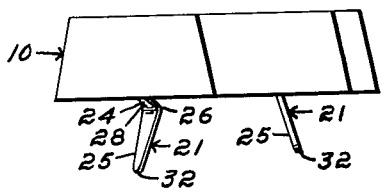
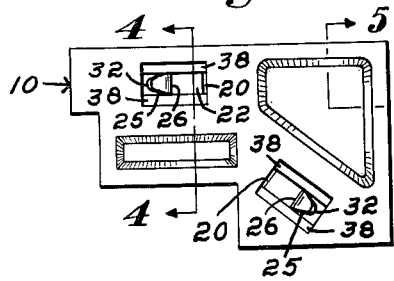
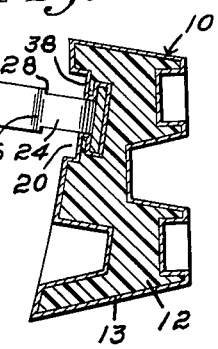
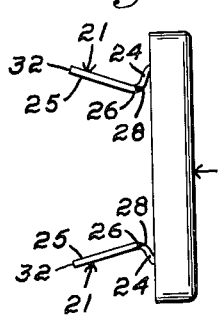
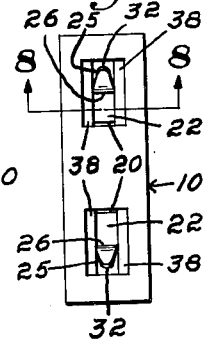
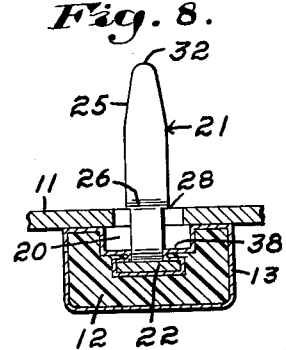
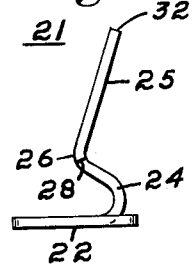
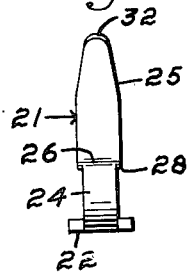
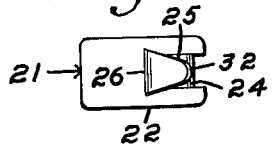
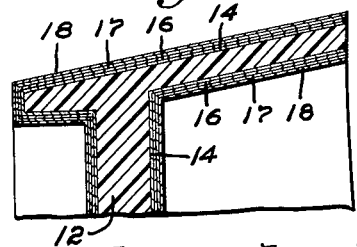
*Inventor:*
Harold S. van Buren Jr.,
by James B. Tiffany Jr. Att'y.

3,234,678
Patented Feb. 15, 1966

3,234,678
ORNAMENTAL LETTER ASSEMBLY
Harold S. van Buren, Jr., Cambridge, Mass., assignor to United-Carr Incorporated, a corporation of Delaware
Continuation of application Ser. No. 58,475, Sept. 26, 1960. This application Aug. 1, 1963, Ser. No. 300,412
1 Claim. (Cl. 40—143)

This invention relates in general to an ornamental assembly and particularly to a fastening device for retaining the assembly on a support.

This invention is a continuation of application Serial No. 58,475 filed September 26, 1960, now abandoned.

Heretofore, ornamental devices, lettering, manufacturing insignia, handles, knobs, name plates, panels, hole covers and the like in the automotive and appliance trade have been constructed of zinc diecast chromium plated material having integral threaded or unthreaded stud members for insertion through an aperture in a support. Nut members or other fastening devices used to secure the devices to the support of necessity break through the exterior plating which permits corrosion to attack the base material. Innovation in the manufacture of said ornamental materials have resulted in plastic devices with a plurality of layers of metal plated thereon and various fastening devices have been developed to secure the device to a supporting panel.

An object of this invention therefore, is to provide an ornamental assembly having fastening means attached thereto adapted to be secured to a panel to eliminate the effects of corrosion.

A further object of this invention is to provide a light weight decorative device having resilient snap fastener portions assembled therewith.

Another object of the invention is to provide a light weight, inexpensive ornamental device adapted for blind attachment to a support without the use of nuts, bolts or the like.

Other objects of the invention will, in part, be obvious, and will, in part, appear hereinafter.

In the drawings:

FIG. 1 is a top plan view of an ornamental assembly mounted on a support;

FIG. 2 is a view in side elevation of the ornamental assembly;

FIG. 3 is a bottom plan view of the ornamental assembly;

FIG. 4 is an enlarged view in section taken on line 4—4 of FIG. 3;

FIG. 5 is a view in section taken on the line 5—5 of FIG. 3 illustrating the metal layers;

FIG. 6 is a view in side elevation of a letter I showing the related position of the attaching means;

FIG. 7 is a bottom plan view of the assembly of FIG. 6;

FIG. 8 is an enlarged view in section taken on the line 8—8 of FIG. 7 illustrating the attachment to a support;

FIG. 9 is a view in side elevation of the fastener;

FIG. 10 is an end view of the fastener; and

FIG. 11 is a top plan view of the fastener.

Referring to the drawings, there is illustrated, as a prime example of one embodiment of this invention, an ornamental letter 10 adapted for attachment to an exterior surface of a supporting panel 11; for example, the manufacturer's name on an appliance or automobile.

The letter 10 is formed of a molded plastic 12 having successive layers 13 of various metals and for illustrative purposes there are shown silver 14, copper 16, nickel 17, and chrome 18 adhered thereto by any of the known processes. As illustrated in FIG. 3, the rear face of the letter 10 has a pair of recesses 20 formed therein for a purpose to be described hereafter.

The fastener 21, as shown in FIGS. 9 through 11, is formed of a resilient metal and comprises a base portion 22 having an arm 24 formed from the medial lateral portion of the base 22 extending arcuately upward out of the plane of the base and then having a reverse bend 26 directing the extension 25 away from the base 22. The arm 24 is of a lesser width than the base portion 22 and at the reverse bend tangs or corners 28 are formed presenting the extension 25 with the corners 28 adapted for locking purposes. The extension 25 tapers gradually to its distal end 32 to provide easy insertion into an aperture of the support 11.

The fastener is formed of a suitable material to provide a degree of spring resiliency. The base portion 22 has an overall dimension slightly less than the recesses 20 to permit easy insertion therein and by any form of staking or crimping by a suitable tool, the surface 38 formed from a portion of the letter 10 adjacent the recesses 20 is compressed downwardly, thereby overlying the base portion 22 and retaining the fastener 10 securely in assembly, as shown in FIGS. 4, 7, and 8.

Referring to FIG. 6 which more clearly illustrates the in line relationship between two such fasteners assembled with an ornamental letter, the fasteners 21 are in opposed relationship with their distal ends 32 spaced from each other in equivalent distance to the preformed apertures in the supporting panel 11; but with the angular bends 26 a lesser distance from each other than the distance between the apertures in the panel 11. To assemble the ornamental device with the panel 11, the distal ends 32 of the fasteners are inserted within the apertures of the panel and by firmly applying pressure to the device, the angular bends 26 will bear against the inner walls of the apertures and continued pressure will flex the extensions 25 away from each other allowing the angular bends 26 to pass through the apertures and causing the tangs 28 to enter into biting engagement with the under surface of the supporting panel 11. The pair of opposed fasteners, due to their inherent resilient characteristics, co-operate with each other to firmly grip the aperture walls of the panel 11 to retain the fastener in assembly.

For purposes of illustration, there is shown a plastic letter having metal layers adhered thereto but it will readily be seen by anyone skilled in the art that any plastic or soft material device could be secured on a panel in a similar manner.

Since certain other obvious modifications may be made in this device without departing from the scope of the invention, it is intended that all matter contained herein be interpreted in an illustrative and not in a limiting sense.

I claim:

An ornamental device of an identifying character for snap fastener attachment to a support, said ornamental device having a body member of yieldable, metallic-coated synthetic plastic material provided with an aperture in a rear face thereof and a fastener member assembled into the said aperture and having a yieldable support engaging portion extending beyond a rear face of the body member, said fastener member also having a base portion of an area less than the area of the aperture and seated within said aperture and said body member having staked portions of the plastic and metal coating thereof overlying said base portion within said aperture thereby firmly holding said fastener member in assembly with said body member.

References Cited by the Examiner

UNITED STATES PATENTS

| | | | |
|---|---|---|---|
| 1,064,897 | 6/1913 | Gabet | 40—143 X |
| 1,739,057 | 12/1929 | Bock | 40—11 X |
| 1,859,792 | 5/1932 | Prouty | 40—142 |
| 2,208,878 | 7/1940 | Wiley | 40—143 X |
| 2,261,578 | 11/1941 | Bauer | 40—136 X |
| 2,817,131 | 12/1957 | Seegers | 40—142 X |
| 2,962,826 | 12/1960 | Matter | 40—135 |
| 2,966,711 | 1/1961 | Fernberg | 24—73 |

EUGENE R. CAPOZIO, *Primary Examiner.*

JEROME SCHNALL, *Examiner.*